US005746294A

United States Patent [19]
Lee

[11] Patent Number: 5,746,294
[45] Date of Patent: May 5, 1998

[54] MAGNETIC BRAKE SYSTEM FOR A VEHICLE

[75] Inventor: Jae-Woong Lee, Seoul, Rep. of Korea

[73] Assignee: Kia Motors Corporation, Seoul, Rep. of Korea

[21] Appl. No.: 856,685

[22] Filed: May 15, 1997

Related U.S. Application Data

[63] Continuation-in-part of Ser. No. 696,429, Aug. 14, 1996, abandoned.

[51] Int. Cl.$^6$ ........................................ B60L 7/00
[52] U.S. Cl. ........................................ 188/163; 188/164
[58] Field of Search ........................ 188/158–164; 310/103–106; 192/84.2, 84.31

[56] References Cited

U.S. PATENT DOCUMENTS

| | | | |
|---|---|---|---|
| 3,889,140 | 6/1975 | Baermann | 310/103 |
| 4,152,617 | 5/1979 | Jauson | 310/105 |
| 4,650,052 | 3/1987 | Okada | 192/84.1 |
| 4,778,021 | 10/1988 | Monshitz et al. | 310/105 |
| 5,023,499 | 6/1991 | Kuwahara | 188/164 |
| 5,094,332 | 3/1992 | Wall | 192/84.1 |
| 5,094,333 | 3/1992 | Mimura | 192/84.1 |
| 5,219,050 | 6/1993 | Kubomiya | 188/164 |
| 5,333,706 | 8/1994 | Mori | 188/161 |
| 5,485,901 | 1/1996 | Akima et al. | 188/164 |

*Primary Examiner*—Chris Schwartz
*Attorney, Agent, or Firm*—Lowe, Price

[57] ABSTRACT

Disclosed is a magnetic brake system for a vehicle, comprising: a plurality of brake disk solenoids for generating the magnetic force; a plurality of brake pad solenoids for generating the magnetic force; a braking sensor for detecting whether a brake pedal is applied; a wheel speed sensor for detecting wheel speed; a magnetic polarity sensor for detecting magnetic polarity of the brake disk solenoids; and a control unit for controlling the brake pad solenoids using signals from the braking sensor, the wheel speed sensor and the magnetic polarity sensor.

3 Claims, 5 Drawing Sheets

MAGNETIC BRAKE SYSTEM FOR A VEHICLE

This application is a cotinuation in part of application Ser. No. 08/696,429 filed Aug. 14, 1996; now abandoned.

FIELD OF THE INVENTION

The present invention relates to a brake system for a vehicle and more particularly to a brake system for a vehicle using magnetic force which can be easily repaired and long lasting.

DESCRIPTION OF RELATED ART

The brake system is one of the most important safety systems on a vehicle. The ability of the brake system to bring the vehicle to the safe controlled stop is absolutely essential in preventing accidental vehicle damage, personal injury, and loss of life.

The conventional brake system depends on the principle of friction for operation. Sliding friction (kinetic friction) is the rubbing action of one object sliding on the surface of another, such as a brake disk on a brake pad or a brake drum on a brake lining. Static friction is the resistance to the sliding of one object on the surface of another. In a brake system, when the brakes are applied there is sliding friction between the shoe and drum or the disc and pad, as long as the wheels are still turning, and there is static friction between the tire and the road surface.

However, since the conventional brake system depends on the principle of friction for operation, the components of the conventional brake system such as pad, drum, lining etc. become worn out over time. Therefore, the components of the conventional brake system must be replaced periodically. In addition, friction produces heat, which must be dissipated by the brake drum and linings or rotor and pad. Heat caused by repeated severe braking and wear causes brake fade. Brake fade is a condition that the driver recognizes as requiring excessive brake pedal pressure, which results in little or no braking.

SUMMARY OF THE INVENTION

The present invention has been made in an effort to solve the above described problems of the conventional brake system for a vehicle.

It is an object of the present invention to provide a brake system for a vehicle which can be long lasting without decrease of braking effect.

It is another object of the present invention to provide a brake system which can be easily repaired and maintained.

To achieve the above objects, the present invention provides a magnetic brake system for a vehicle, comprising: a plurality of brake disk solenoids for generating the magnetic force; a plurality of brake pad solenoids for generating the magnetic force; a sensor for detecting whether a brake pedal is applied; a wheel speed sensor for detecting wheel speed; a magnetic polarity sensor for detecting the magnetic polarity of the brake disk solenoids; and a control unit for controlling the brake pad solenoids in accordance with the braking sensor signal, the wheel speed sensor signal and the magnetic polarity sensor signal.

BRIEF DESCRIPTION OF THE DRAWINGS

The foregoing and other objects of the present invention will become more apparent from the detailed description below when taken in conjunction with the following drawings in which.

DETAILED DESCRIPTION OF THE PREFERRED EMBODIMENT

A preferred embodiment of the present invention will now be described in detail with reference to the accompanying drawings.

Figure 1:
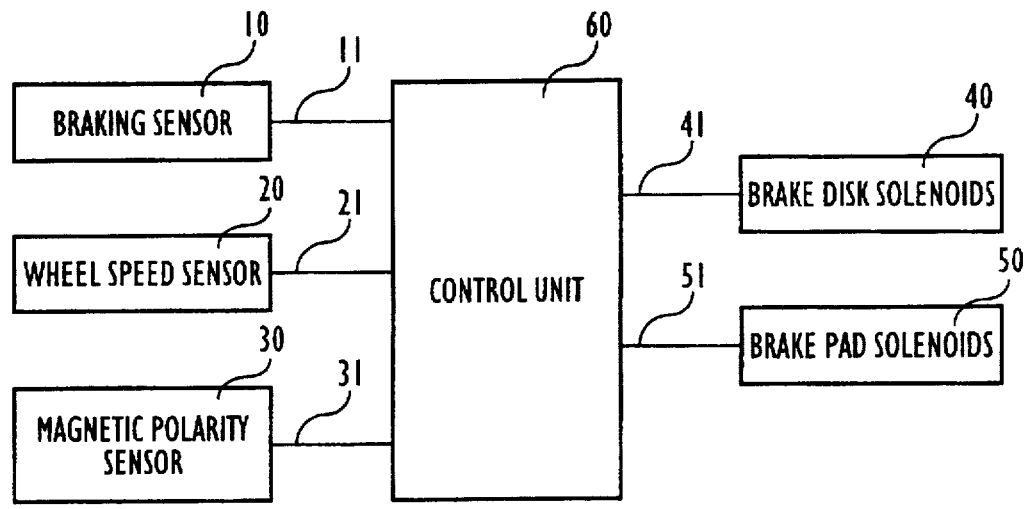
FIG. 1 is a schematic block diagram illustrating a magnetic brake system in accordance with a preferred embodiment of the present invention.

Referring first to FIG. 1, the inventive brake system includes four brake disk solenoids 40 mounted at 90° relative to each other; within a brake disk 110 formed in the driving axle 100 for generating the magnetic force, four brake pad solenoids 50 mounted at 90° relative to each other; within a brake pad 120 formed in the fixed shaft 122 for generating the magnetic force opposite to the magnetic force of the brake disk solenoids, a brake sensor 10 for detecting the operation state of the brake pedal(not shown), a wheel speed sensor 20 for detecting the wheel speed, a magnetic polarity sensor 30 for detecting the magnetic polarity of brake disk solenoids 40, and a control unit 60 for controlling the magnetic polarity of brake pad solenoids 50. The centers of the brake disk solenoids 40 and the brake pad solenoids 50 are positioned on circles having the same diameter. Preferably, the number of brake disk solenoids 40 and brake pad solenoids 50 is equal. It should be understood that although four brake disk solenoids 40 and brake pad solenoids 50 is disclosed, any such number can be used. For simplicity, because each of the four wheel brakes used on a vehicle can be the same, the invention will only be described for a single wheel brake.

In addition, the input of the control unit 60 is electrically connected to the output of the braking sensor 10, the wheel speed sensor 20, and the magnetic polarity sensor 30.

In addition, the output of the control unit 60 is electrically connected to the input of the brake disk solenoids 40 and brake pad solenoids 50.

Figure 2:
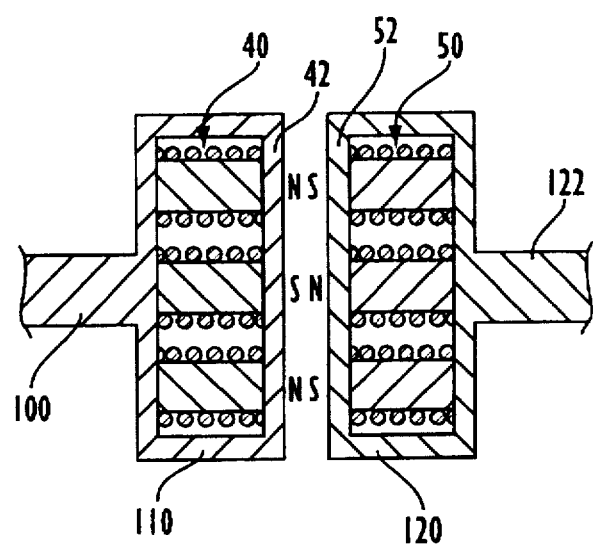
FIG. 2 is a schematic sectional view illustrating a brake disk and a brake pad in accordance with the present invention.
Figure 3:
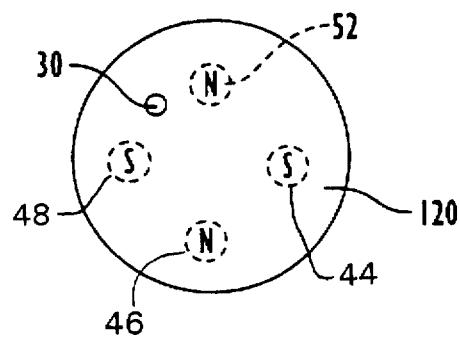
FIG. 3 is a schematic front view illustrating the brake pad in accordance with the present invention.

Referring to FIG. 2, a disk 110 is formed in a driving axle 100 and a pad 120 is formed in a fixed shaft 122. The brake disk 110 and the brake pad 120 are provided with four solenoids 40 and 50 for generating the magnetic force, respectively. Each of the brake disk and brake pad solenoids 40 and 50 has a different magnetic pole from the adjacent solenoids 40 and 50 as shown in FIG. 3. Although a magnetic polarity sensor 30 is positioned, for example, between two adjacent front ends 52 of the brake pad solenoids 50 in FIG. 3, it can be positioned at any other place suitable to sense the polarity of the brake disk solenoids 40.

When the brake pedal is applied, the braking sensor 10 detects this state in a known manner and transmits the signal to the control unit 60. The control unit 60 supplies current to the solenoids 40 and 50 to be magnetized such that each front end 42 of the brake disk solenoids 40 have the opposite magnetic pole of each front end 52 of the brake pad solenoids 50, respectively. The control unit 60 changes the direction of the current of the brake pad solenoids 50 to accomplish it.

Figure 4:
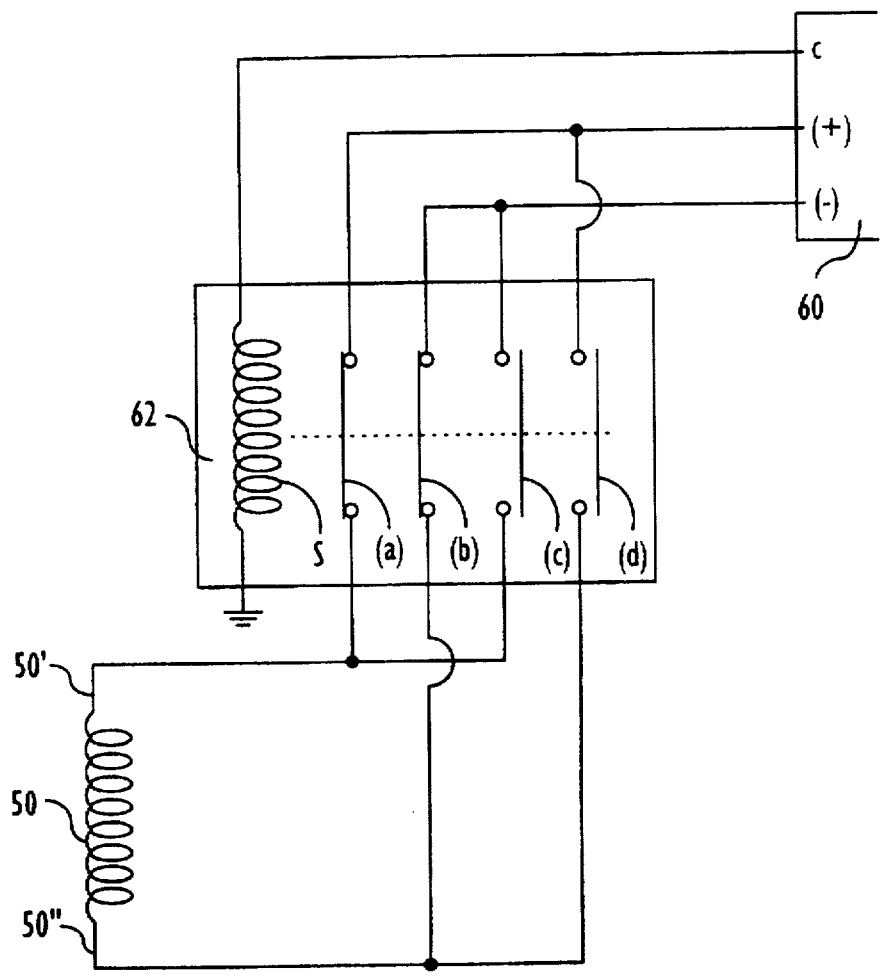
FIG. 4 is a schematic diagram illustrating a "C" type relay positioned between the control unit and the brake pad solenoids.

Referring to FIG. 4, a "C" type relay 62 is mounted in the control unit 60 for the purpose of changing the direction. The "C" type relay 62 comprises form switches (a), (b), (c), (d) and a control solenoid S. Solenoid S is coupled to a control line C to a ground. Switch (a) is coupled to a positive terminal of the control unit 60 (+) and to a first end 50' of brake solenoid 50. Switch (b) is coupled to a negative terminal of the control unit 60 (−) and to a second end 50" of brake solenoid 50. Switch (c) is also coupled to the negative terminal (−) and to end 50' of brake solenoid 50. Switch (d) is also coupled to the positive terminal (+) and to end 50" of brake solenoid 50. When the brake sensor 10 senses the operation of the brake, current is supplied to the (+) and (−) terminals within the control unit 60 and current flows from the (+) terminal to the (−) terminal via switch (a), the brake solenoids 50, and switch (b).

In order to change the direction of the current, the control unit 60 lets a current flow through the control line C, then the solenoid S is magnetized, which opens switches (a) and (b) and closes switches(c) and (d). Then the current flows in the opposite direction.

Figure 5:
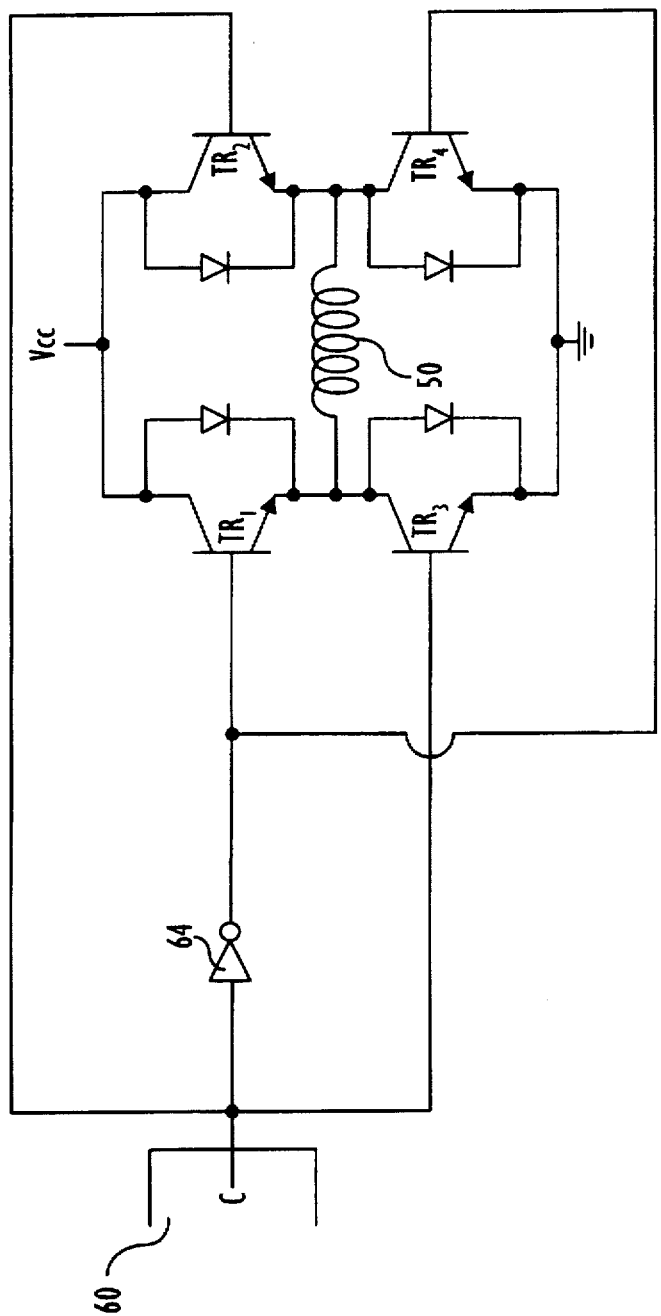
FIG. 5 is a schematic diagram illustrating an inverter circuit positioned between the control unit and the brake pad solenoids.

Alternatively, referring to FIG. 5, transistors are mounted in the control unit 60 for the purpose of changing the direction of the current. The circuit inverter 64 which is used for reversing signals is positioned between control line C and the bases of transistors TR1 and TR4. The bases of transistor TR2 and TR3 are connected to control line C. Transistor TR1 is connected to $V_{cc}+$ and to TR2 at its collector and to TR3 and brake pad solenoid 50 at its emitter. Transistor TR4 is connected to $V_{cc}-$ and to the transistor TR3 at its emitter and to transistor TR2 and brake pad solenoid 50 at its collector. Transistor TR3 is connected to $V_{cc}-$ and to the emitter of transistor TR4 at its emitter and to the emitter of transistor TR1 and brake pad solenoid 50 at its collector. Transistor TR2 is connected to $V_{cc}+$ and to the collector of transistor TR1 at its collector and to the collector of transistor TR4 and brake pad solenoid 50 at its emitter.

When the signal (voltage) from the control line C is HIGH, whereas the signal to TR2 and TR3 is ON, the signal to TR1 and TR4 is OFF owing to the inverter, and current flows from TR2 to TR3.

And if the signal from the control line C is LOW, whereas the signal to TR2 and TR3 is OFF, the signal to TR1 and TR4 is ON, thus the current flows from TR1 to TR4. So the direction of the current of the brake pad solenoid 50 changes.

Figure 6:
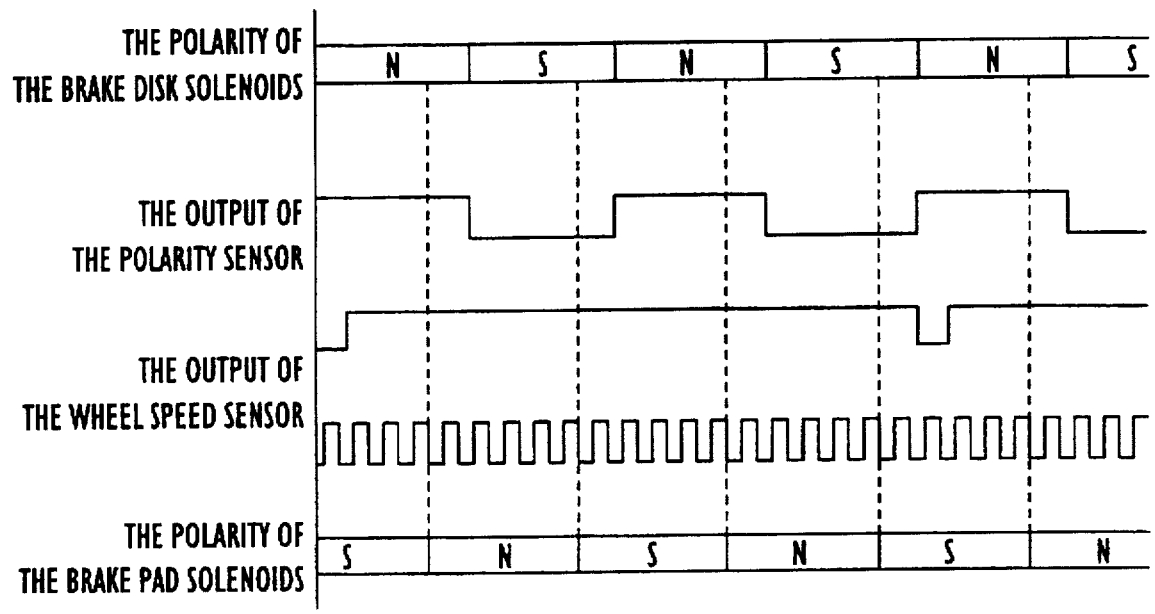
FIG. 6 is a timing diagram mapping the changing of direction of the current flowing to the brake pad.

The control unit 60 determines the time to change the direction of the current of the brake pad in accordance with the wheel speed (from wheel speed sensor 20) and polarity of the brake disk solenoid 40 (from the polarity sensor 30). One example is illustrated in FIG. 6. The first graph shows the polarity of brake disk solenoids 40, and the second shows the corresponding output of the polarity of the brake disk solenoids 40 sensed by polarity sensor 30. The reason why the polarity of brake disk solenoids 40 changes periodically is that the brake disk 110 rotates with a driving axle 100. The third and fourth graph show the output of a wheel speed sensor 20. One period in the former graph means one rotation of the wheel and the latter is an output in encoder type. The wheel speed sensor 20 may comprise a disk, for example, rotating with a brake disk 110 and having a hole and a number of slits arranged regularly on the periphery of the disk. The fifth graph shows the polarity of brake pad solenoids 50 changed by control unit 60. The time to change the direction should be memorialized (mapped) in the control unit 60.

The output of the polarity sensor 30 may be high or low according to the polarity of the rotating brake disk solenoid in turn, which the control unit 60 recognizes with the output of the polarity sensor 30.

Figure 7:
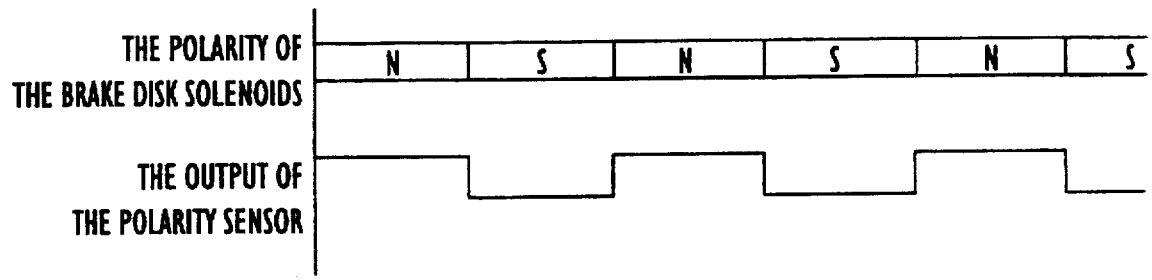
FIG. 7 is a timing diagram depicting the relationship between the magnetic sensor and the polarity of the brake pad solenoids.

Referring to FIG. 7, for example,the polarity of the brake disk solenoid is recognized as "N" by the control unit 60 if the output of the polarity sensor is high, and as "S" if it is low.

The magnetic polarity sensor 30 senses the polarity of the brake disk solenoids 40.

Figure 8:
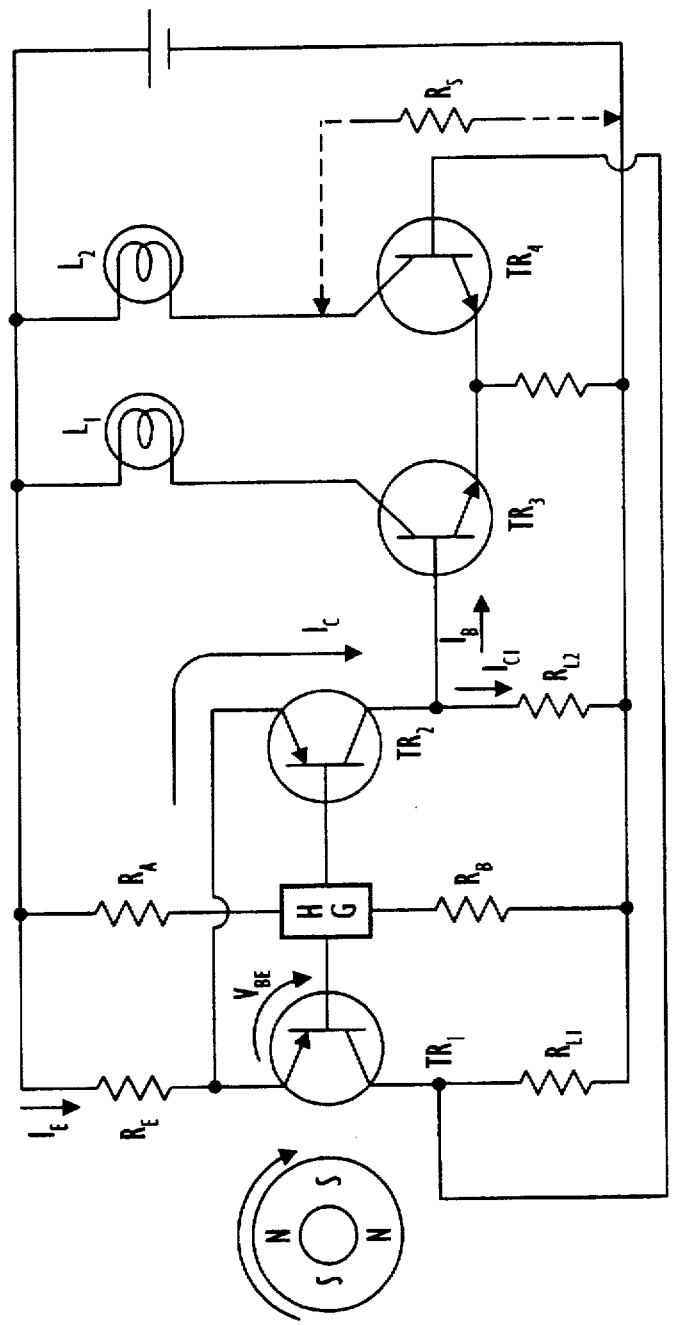
FIG. 8 is a circuit diagram of a polarity sensor.

FIG. 8 is an example of the polarity sensor 30, which appears on "Method for Using Sensors and Circuit Design" published on Jun. 21, 1992 by a Korean publishing company, SEWOON. FIG. 6 shows a device for detecting polarity in a magnetic field. When a hall sensor HG receives a North-direction flux, a transistor TR2 becomes ON, which makes an amplifying transistor TR3 ON. Thus, a light emitting diode or lamp L1 is lit, which means that the device (sensor) detects North polarity.

When the sensor HG receives a South-direction flux, transistors TR1 and TR4 become ON, and the other light emitting diode or lamp L2 is lit, which means that the device detects South polarity.

If this circuit is constructed as a generating type, instead of light emitting diodes, many other applications, for example solenoids and motor, can be made. In operation the position of the brake disk solenoids 40 changes in accordance with rotation of the driving axle 100 but the position of the brake pad solenoids 50 does not change, the front ends 42 of the brake disks solenoids 40 are located at a minimal distance from the front ends of brake pad solenoids 50 for a portion of each rotation of the wheel. For example, front end 42 will be opposite to front ends 52 for a portion of each rotation of the wheel. The control unit 60 controls the current direction of the brake pad solenoid 50 such that the front end 52 of brake pad solenoid 50 have the opposite magnetic pole of the front end 42 of the brake disk solenoids 40 such that the direction of the current is change four times for each rotation of the wheel.

That is, the magnetic attractive force between the brake disk 110 and the brake pad 120 prevents the driving axle 100 from rotating. Typically, the polarity of brake disk solenoid 40 does not change but the polarity of brake pad solenoid 50 changes. For example, if the magnetic pole of a front end 42 of the brake disk solenoids 40 is North, the control unit 60 changes the magnetic pole of the front end 52 of the brake pad solenoid 50 to South by changing the current direction. And while the brake disk 110 rotates, if the magnetic pole of a front end 42 of the brake disk solenoids 40 is South, the control unit 60 changes the magnetic pole of the front end 52 of the brake pad solenoid 50 corresponding to the front end 42 of the brake disk solenoids 40 to North by changing the current direction.

As a result, attractive force between the brake disk 110 and the brake pad 120 results in decrease of rotating speed of the brake disk 110 and the driving axle 100, and eventually stops rotation of driving axle 100.

As described above, since the braking system according to the present invention uses magnetic force instead of friction force, there will not occur any wear of components of the braking system and heat from friction of the components, which means that the braking system is long lasting without replacement of any components and without any braking fade phenomenon.

While this invention has been described in connection with what is presently considered to be the most practical and preferred embodiments, it is to be understood that the present invention is not limited to the disclosed embodiment, but, on the contrary, it is intended to cover various modifications and equivalent arrangements included within the spirit and scope of the appended claims.

What is claimed is:

1. A magnetic brake system for a vehicle, comprising:

a plurality of brake disk solenoids for generating a magnetic force;

a plurality of brake pad solenoids for generating a magnetic force;

a braking sensor for detecting whether a brake pedal is applied;

a wheel speed sensor for detecting wheel speed;

a magnetic polarity sensor for detecting magnetic polarity of said brake disk solenoids; and a control unit for controlling said brake pad solenoids using signals from said braking sensor, said wheel speed sensor and said magnetic polarity sensor.

2. A magnetic brake system according to claim 1, wherein number of said brake disk solenoids and brake pad solenoids is 4.

3. A magnetic brake system according to claim 1, wherein each magnetic pole of said brake disk solenoids and said of brake pad solenoids is different from adjacent solenoids, respectively.

* * * * *